(No Model.)
E. MAY.
Plow.
No. 232,530.  Patented Sept. 21, 1880.
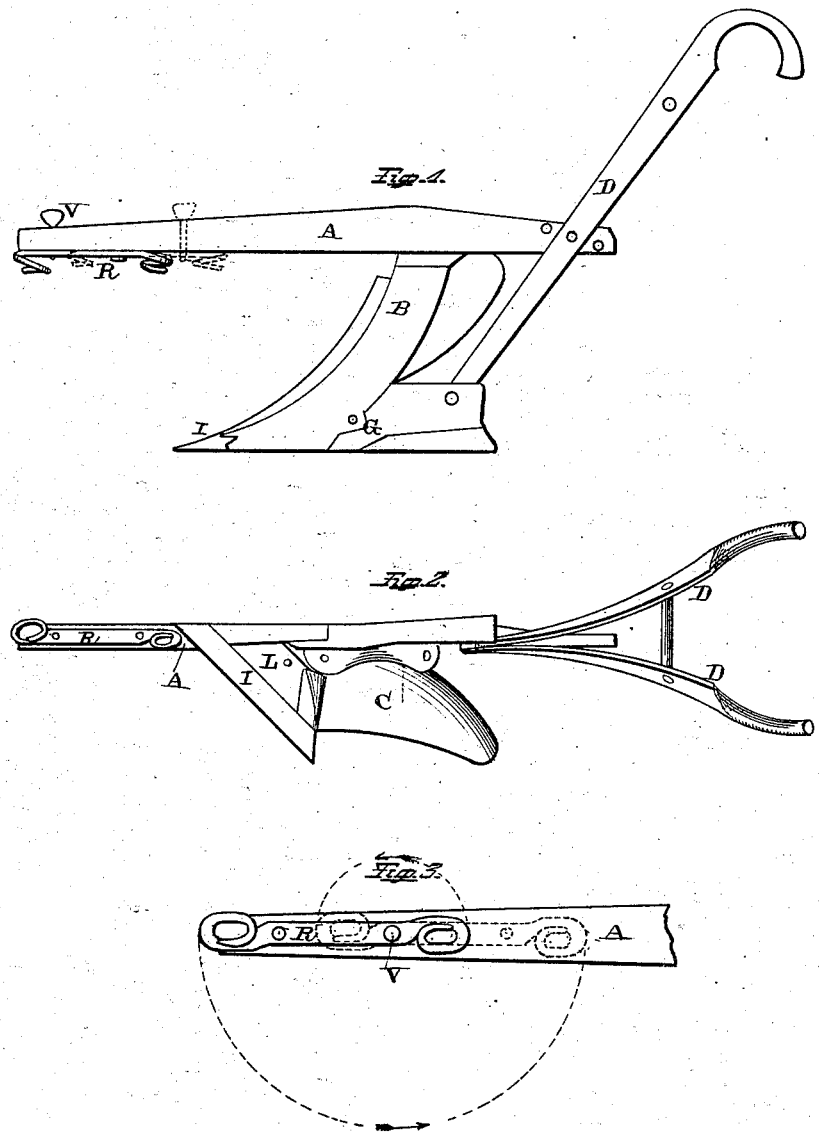
Witnesses:
W. W. Mortimer.
Chas. H. Isham
Inventor:
E. May
per
F. W. Lehmann,
Atty

UNITED STATES PATENT OFFICE.

ELIHU MAY, OF LINCOLN COUNTY, MISSISSIPPI.

PLOW.

SPECIFICATION forming part of Letters Patent No. 232,530, dated September 21, 1880.

Application filed July 22, 1880. (No model.)

*To all whom it may concern:*

Be it known that I, ELIHU MAY, of the county of Lincoln and State of Mississippi, have invented certain new and useful Improvements in Plows; and I do hereby declare the following to be a full, clear, and exact description of the invention, such as will enable others skilled in the art to which it pertains to make and use it, reference being had to the accompanying drawings, which form part of this specification.

My invention relates to an improvement in plows; and it consists in forming a hook upon each end of a draft-rod and pivoting this rod to the under side of the front end of the beam, so that the rod can be turned upon its pivot to bring the forward hook back under the rear end of the beam, or so as to project slightly beyond the beam, according as it is desired to hitch the team close to or far away from the plow.

Figure 1 is a side elevation of my invention, taken from the landside. Fig. 2 is an inverted view of the same. Fig. 3 shows different positions of the draft-rod.

A represents the beam; B, the standard; C, the mold-board, and D the handles. These handles are pivoted at their lower ends to the inside of the landside, and project up upon each side of the beam, to which they are secured by means of a suitable bolt. In order that these handles may be made adjustable, so as to suit different-sized persons, a series of holes is made through the rear end of the beam, so that the handles can be shifted back and forth, as may be preferred. This adjustability of the handles is very simple and easy, and will be found to be a great convenience.

Upon the rear edge of the standard, near its lower end, is made a suitable projection, G, which fits in a corresponding recess made in the front edge of the landside, and which projection serves as a brace for the purpose of securing the landside more rigidly in position.

The cutting-edge and point I of the plow is made in a single piece, as shown, and has a tenon, L, projecting backward from its rear edge, so as to fit in a corresponding recess or pocket that is made to receive it under the front edge of the mold-board. This cutting-edge and point, being formed alike at both ends, should one point become dull or worn it is only necessary to remove the set-screw which secures it in position, turn it one-half around, and the dull point will be made to project out beyond the side of the mold-board, while the other point, which has not been dulled, will project out beyond the front end of the standard. By means of this removable cutting-edge and point it will readily be seen that twice as much wear can be obtained from the plow without having to sharpen it as can be where the point is not made reversible, as here shown.

Pivoted to the under side of the beam near its front end is the draft-rod R, which has a hook formed at each end for the attachment of the draft-animal. When this draft-rod is turned in one position its front end is moved back some distance beyond the front end of the machine, so as to bring the attachment of the draft-animals much nearer to the plow, and thus enable them to draw the plow along with much greater ease. When this draft-rod is turned around in the opposite direction its front end projects outward a slight distance beyond the front end of the beam, so as to move the draft-animals farther out from the front end of the plow.

Through the beam, at equal distances from the pivot upon which the draft-rod turns, are made two holes, through which is passed the pin V, which holds the rod in either one of the positions to which it has been adjusted. As the hook upon each end of the draft-rod always turns in the proper position to have the animals attached to it, different points of attachment are presented, to any one of which the team may be fastened, according as it is desired to hitch it close to or farther away from the point of the plow.

Having thus described my invention, I claim—

The pivoted draft-rod R, having a hook formed on each end, in combination with the plow-beam A, and a bolt for holding the rod in either position into which it may be turned, substantially as shown and described.

In testimony that I claim the foregoing I have hereunto set my hand this 24th day of May, 1880.

ELIHU MAY.

Witnesses:
D. H. S. COX,
T. A. WILLOUGHBY.